US006390213B1

(12) United States Patent
Bleicher

(10) Patent No.: US 6,390,213 B1
(45) Date of Patent: May 21, 2002

(54) MANEUVERABLE SELF-PROPELLED CART

(76) Inventor: Joel N. Bleicher, Rte. 3, Box 30, Council Bluffs, IA (US) 51503

( * ) Notice: Subject to any disclaimer, the term of this patent is extended or adjusted under 35 U.S.C. 154(b) by 0 days.

(21) Appl. No.: 09/440,737

(22) Filed: Nov. 16, 1999

Related U.S. Application Data
(60) Provisional application No. 60/108,551, filed on Nov. 16, 1998.

(51) Int. Cl.[7] ............................ B60K 1/02; B60G 3/00
(52) U.S. Cl. ................. 180/65.1; 180/6.48; 180/19.3; 180/59; 280/124.179; 5/86.1
(58) Field of Search ................. 180/65.1, 6.48, 180/6.5, 15, 16, 19.1, 19.3, 24.03, 59, 60, 61; 280/124.179; 5/86.1, 600, 611

(56) References Cited

U.S. PATENT DOCUMENTS

| | | |
|---|---|---|
| 813,213 A | 2/1906 | Johnson |
| 1,598,124 A | 8/1926 | Evans |
| 2,635,899 A | 4/1953 | Osbon, Jr. |
| 2,999,555 A | 9/1961 | Stroud et al. |
| 3,112,001 A | 11/1963 | Wise |
| 3,380,546 A | 4/1968 | Rabjohn |
| 3,413,663 A | 12/1968 | Swann |
| 3,452,371 A | 7/1969 | Hirsch |
| 3,724,003 A | 4/1973 | Ellwanger et al. ............. 5/68 |
| 3,814,199 A | 6/1974 | Jones ........................ 180/6.5 |
| 3,876,024 A | 4/1975 | Shieman et al. ............... 180/19 |
| 4,137,984 A | 2/1979 | Jennings et al. ............... 180/98 |
| 4,415,049 A | 11/1983 | Wereb ........................ 180/6.5 |
| 4,475,611 A | 10/1984 | Fisher ........................ 180/6.5 |
| 4,489,449 A | 12/1984 | Failor et al. ................... 5/86 |
| 4,687,215 A | 8/1987 | Brendgord et al. ......... 280/79.1 |
| 4,718,133 A | 1/1988 | DiMatteo et al. ............... 5/81 |
| 4,811,988 A | 3/1989 | Immel ......................... 298/2 |
| 4,921,308 A | * 5/1990 | Yelton et al. ................ 299/39 |
| 4,951,766 A | * 8/1990 | Basedow et al. ............. 180/6.5 |
| 5,083,625 A | 1/1992 | Bleicher ..................... 180/65.1 |
| 5,180,025 A | * 1/1993 | Yeh et al. ................... 180/65.5 |
| 5,772,237 A | * 6/1998 | Finch et al. ................. 280/704 |
| 6,131,215 A | * 10/2000 | Lindell ....................... 5/86.1 |

* cited by examiner

Primary Examiner—Brian L. Johnson
Assistant Examiner—Tony Winner
(74) Attorney, Agent, or Firm—Suiter & Associates PC

(57) ABSTRACT

A maneuverable self-propelled cart having a drive assembly including independently suspended drive wheels for propelling the cart over rough or uneven surfaces. The drive assembly is comprised of a drive wheel carriage having at least two drive wheels. The drive wheel carriage may include a turntable or the like adapted to rotate the carriage about a substantially vertical axis relative to the frame of the cart. Each drive wheel may be independently suspended beneath the cart frame by a suspension apparatus so as to allow each drive wheel to individually engage a ground or floor surface.

30 Claims, 5 Drawing Sheets

MANEUVERABLE SELF-PROPELLED CART

CROSS-REFERENCE TO RELATED APPLICATIONS

The present application claims the benefit under 35 U.S.C. § 119(e) of U.S. Provisional Application No. 60/108,551, filed Nov. 16, 1998. Said U.S. Provisional Application No. 60/108,551 is herein incorporated by reference in its entirety.

BACKGROUND OF THE INVENTION

The present invention relates generally to wheeled carts and more particularly to maneuverable self-propelled carts.

Self-propelled carts are widely used by workers in many industries to move heavy or unwieldy loads. Typically, self-propelled carts may be adapted to a wide variety of applications. For example, workers in the construction industry may use self-propelled wheelbarrows, stands, and the like to transport construction supplies, debris, and other materials in and around a construction site. Similarly, workers in a manufacturing plant or warehouse may employ self-propelled hand trucks to move heavy pallets of equipment or inventory.

In an exemplary application, carts or gurneys having a stretcher or bed surface are often used in the health care industry to move patients from place to place within a hospital. However, when a heavy patient is placed on the bed surface of such a gurney, the resulting inertia of the gurney-patient combination may make the gurney difficult to move unless some means of powered propulsion is provided.

Often, self-propelled carts are used to maneuver loads over rough ungraded ground, over uneven surfaces, or in confined spaces where the advantage of self-propulsion may be lost. For example, a hospital attendant may have to maneuver a self-propelled gurney over an obstacle or up a ramp wherein the gurney's drive wheels are lifted from the floor. To move the gurney further, the attendant may have to physically push or pull the gurney himself leading to the possibility of injury.

For these reasons, it would be advantageous to provide a maneuverable self-propelled cart capable of maneuver over rough ungraded ground, uneven surfaces, or in confined spaces.

SUMMARY OF THE INVENTION

Accordingly, the present invention is directed to a maneuverable self-propelled cart comprised of a drive assembly having independently suspended drive wheels that propel the cart over rough or uneven surfaces. The drive assembly is comprised of a drive wheel carriage having at least two drive wheels. The drive wheel carriage may include a turntable or the like adapted to rotate the carriage about a substantially vertical axis relative to the frame of the cart. Each drive wheel may be independently suspended beneath the cart frame by a suspension apparatus. The suspension apparatus preferably allows each drive wheel to individually engage a ground or floor surface. A reversible motor may be operably coupled to each drive wheel. This motor may rotatably drive the drive wheel to move the cart or rotate the drive wheel carriage.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

These and other features, aspects, and advantages of the present invention will become better understood with regard to the following description, appended claims, and accompanying drawings, of which:

DETAILED DESCRIPTION OF THE INVENTION

The present invention provides a maneuverable self-propelled cart having a drive assembly including independently suspended drive wheels which may propel the cart over rough or uneven surfaces. The drive assembly may be comprised of a drive wheel carriage having at least two drive wheels. However, drive wheel carriages having three, four or more drive wheels are anticipated depending on the application. For example, a cart adapted for use as a hospital gurney may include with a drive wheel carriage having only two independently suspended drive wheels while a cart utilized as a maneuverable self-propelled wheelbarrow at a construction site may comprise a drive wheel carriage having four independently suspended drive wheels. The drive wheel carriage may include a turntable or the like adapted to rotate the carriage about a substantially vertical axis relative to the frame of the cart. In this manner, the cart may be propelled along both its longitudinal and transverse axes, increasing maneuverability of the cart in confined areas. The suspension apparatus preferably suspends and extends each drive wheel underneath the cart frame independently of each of the other drive wheels. Each drive wheel may thus individually engage an uneven ground or floor surface. A reversible motor may be operably coupled to each drive wheel. This motor may rotatably drive the drive wheel in either a clockwise or counterclockwise direction to move the cart or rotate the drive wheel carriage.

An exemplary embodiment of the present invention is depicted in FIGS. 1 through 7 wherein the maneuverable self-propelled cart is adapted for use as a hospital gurney.

Figure 1:
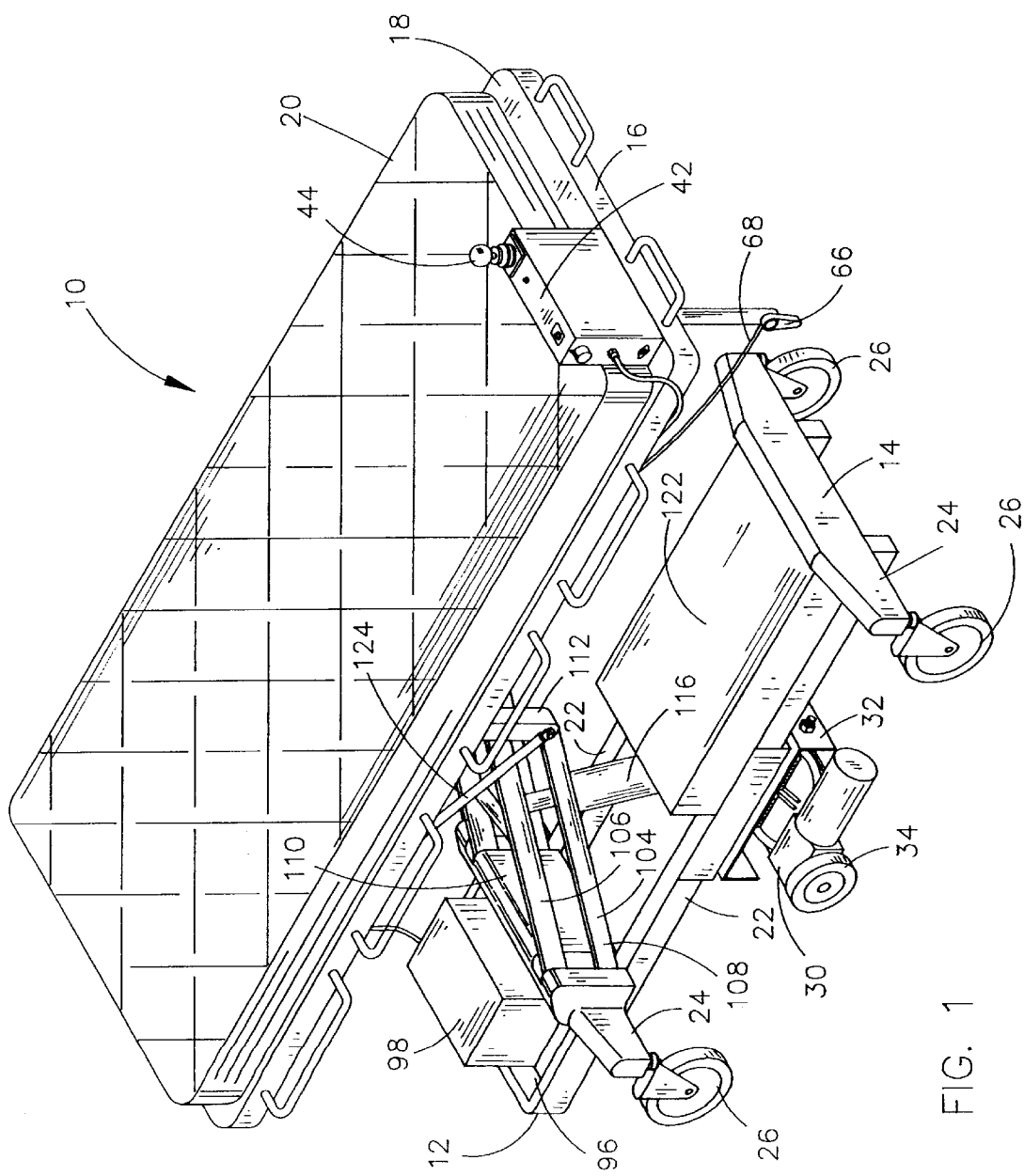
FIG. 1 is a perspective view depicting a maneuverable self-propelled cart according to an exemplary embodiment of the present invention.

Referring now to FIG. 1, the maneuverable self-propelled cart or gurney 10 may be comprised of a cart frame 12 having a bottom frame portion 14 and a generally horizontal upper frame portion 16. The upper frame portion 16 may include a stretcher frame 18 which may support a mattress, pad, or the like 20 on which a patient may lie. Hand holds, rails or the like 22 may extend along the perimeter of the upper frame portion 16 allowing an operator such as a hospital attendant, nurse, doctor or the like to propel and maneuver the cart. Preferably, the bottom frame portion 14 may be comprised of one or more longitudinal frame members 22 extending substantially the entire length of the cart 10. Cross-members 24 may be spaced along the longitudinal frame members 22. Preferably, the cross-members 24 may be attached to the longitudinal frame members 22 via welding, bolting or the like to form a rigid frame or base for the cart 10. Wheels or castors 26 may be mounted to the bottom surfaces of the outer ends 28 of the cross-members 24. Each wheel 26 preferably swivels independently through a 360° arc about a generally vertical axis so that the cart may be steered in any direction by the operator. A drive assembly 30 may be mounted to the bottom frame portion 14 to provide motive force the cart 10. The drive assembly 30 preferably includes a drive wheel carriage 32 having drive wheels 34 adapted to engage a ground or floor surface.

Figure 2A:
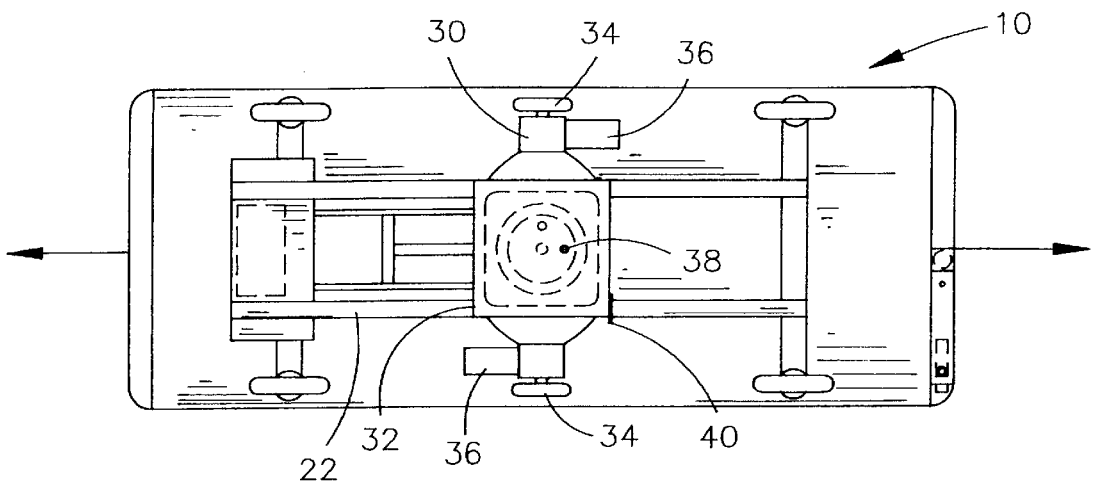
FIG. 2A is a bottom plan view depicting a maneuverable self-propelled cart according to the exemplary embodiment of the present invention shown in FIG. 1, wherein the drive wheel carriage is aligned to maneuver the cart along its longitudinal axis.
Figure 2B:
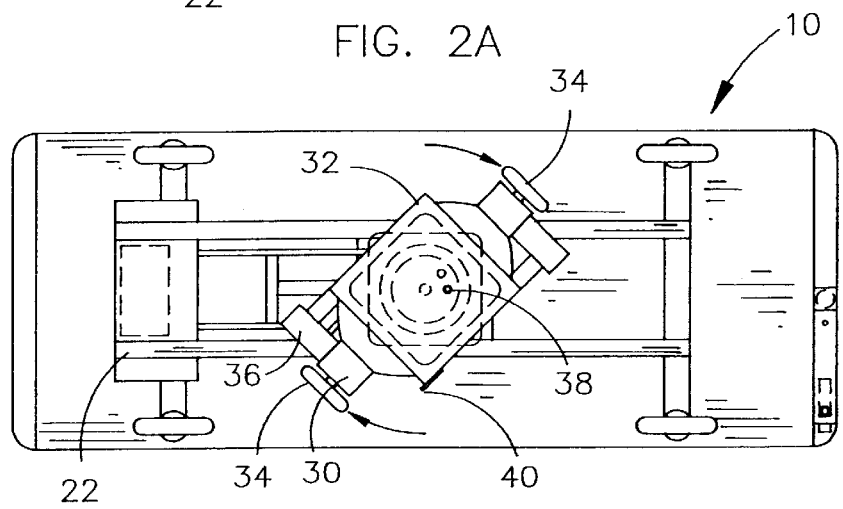
FIG. 2B is a bottom plan view depicting a maneuverable self-propelled cart according to the exemplary embodiment of the present invention shown in FIG. 1, wherein the drive wheel carriage may be rotated from a position aligned to maneuver the cart along its longitudinal axis to a position aligned to maneuver the cart along its transverse axis.
Figure 2C:
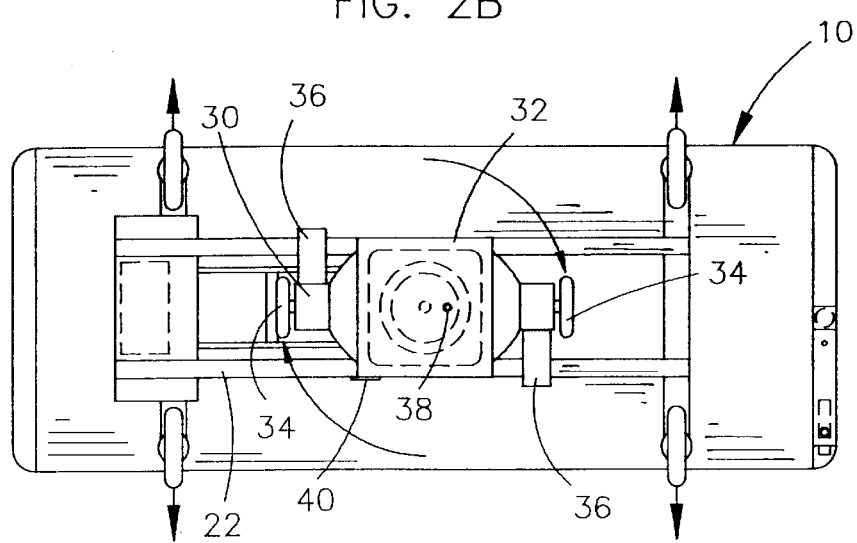
FIG. 2C is a bottom plan view depicting a maneuverable self-propelled cart according to the exemplary embodiment of the present invention shown in FIG. 1, wherein the drive wheel carriage is aligned to maneuver the cart along its transverse axis.

Turning now to FIGS. 2A, 2B, and 2C, the drive assembly 30 may propel the cart 10 along either its longitudinal axis (i.e., forward or backward) or its transverse axis (i.e., side to side). A reversible motor 36 may be operably coupled to each drive wheel 34 and may drive or turn the drive wheel 34 in either a clockwise or counterclockwise direction. To propel the cart forward or rearward, the drive wheel carriage 32 may be aligned along the longitudinal axis of the cart 10. The reversible motors 36 may be utilized to drive the drive wheels 34 in the same direction wherein both drive wheels 34 turn either clockwise or counterclockwise thereby propelling the cart 10 either forward or rearward. Preferably, a locking mechanism 38 may engage a hole in the turntable to prevent the unintentional rotation of drive wheel carriage 32 from its alignment along the longitudinal axis of the cart 10.

The drive wheel carriage 32 may be rotated about the vertical center of the cart frame 12 by disengaging the locking mechanism 38 and powering the reversible motors 36 such that they drive the drive wheels 34 in opposite directions (i.e., one drive wheel 34 clockwise and one counterclockwise). In this manner, the drive wheel carriage 32 may rotate, as shown in FIG. 2B, until the drive wheels 34 are aligned along the transverse axis of the cart 10 as shown in FIG. 2C. A stop 40 may be positioned on the drive wheel carriage frame 42. This stop may engage a longitudinal frame member 22 to prevent further rotation of the carriage 32 once it is aligned with the transverse axis of the cart 10. Now aligned along the transverse axis of the cart, the reversible motors 36 may be powered to drive the drive wheels 34 in the same direction (i.e., either both drive wheels are turned clockwise or both are turned counterclockwise) to propel the cart 10 from side to side. In an exemplary embodiment, the reversible motors 36 may also drive their respective drive wheel 34 at varying speeds. In this manner, the cart 10 may be steered by the operator by either increasing or decreasing the rotational speed of one drive wheel 34 relative to the other.

A controller 42, which may include a dual-axis joystick control 44 or the like, may be mounted to the upper frame portion 16 (FIG. 1). The controller may independently control the direction and rotational rate that the reversible motors 36 utilized to drive or turn the drive wheels 34. An operator may propel and steer the cart 10 utilizing the joystick control 44. By pressing straight and forward on the joystick control 44, the cart 10 may be made follow a straight line forward since both reversible motors 36 will turn the drive wheels 34 counterclockwise at the same rate. Likewise, by pulling straight back on the joystick control 44, the cart 10 may be made to go in reverse along a straight path since both reversible motors 34 will turn the drive wheels 34 clockwise at the same rate. It should also be obvious that by pressing the joystick control 44 forward and to the left, the cart 10 may be made to turn left at a rate proportional to the extent the joystick control 44 is moved forward and left, and that by pressing the joystick control 44 forward and to the right, the cart 10 may be made to turn right at a rate proportional to the extent the joystick control 44 is moved forward and right. Preferably, the cart 10 may be steered in a similar fashion in a backwards direction or when the drive wheel carriage 32 is rotated to align the drive wheels 34 with the cart's transverse axis.

Figure 3:
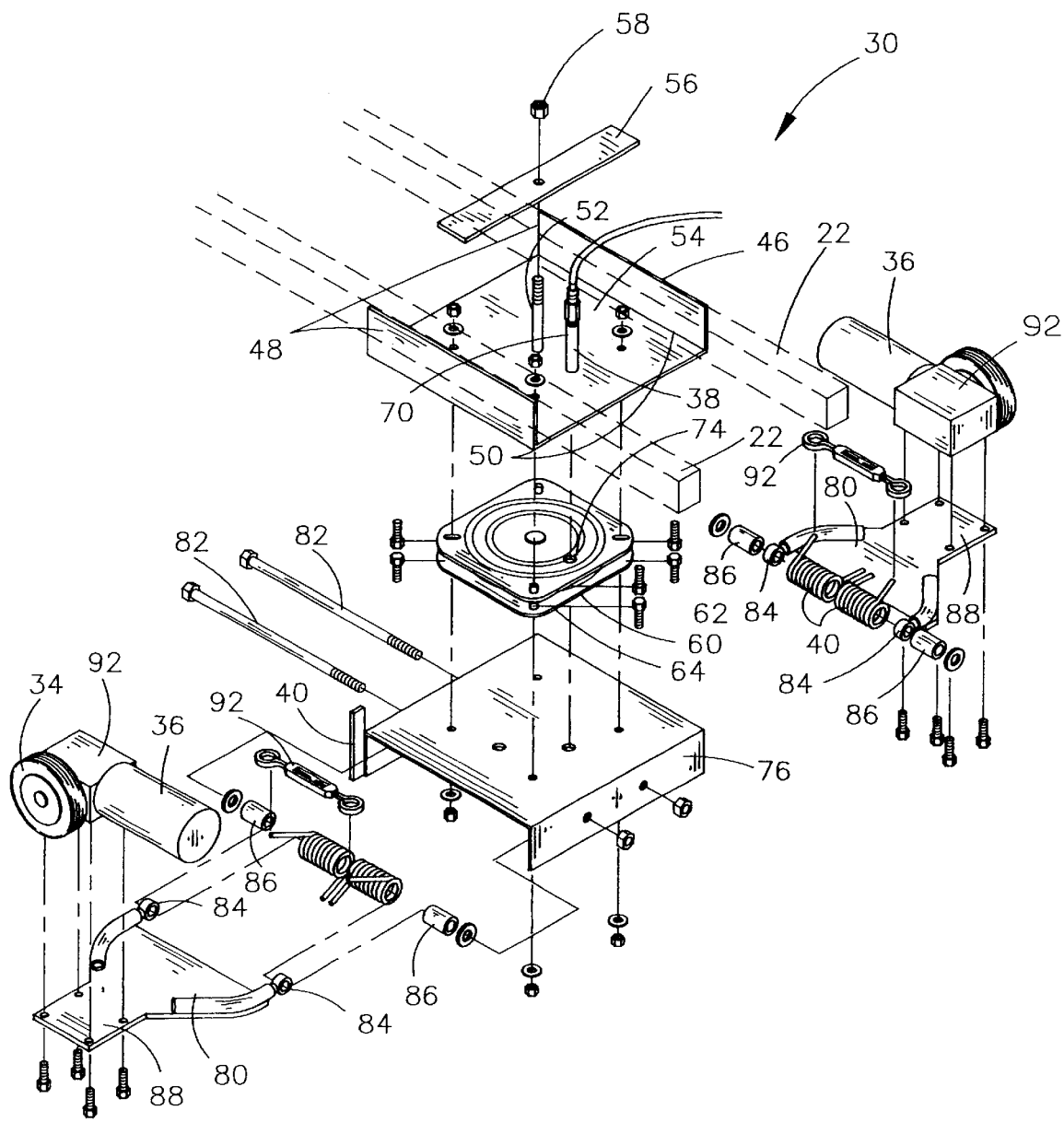
FIG. 3 is an exploded view depicting the drive wheel carriage of the maneuverable self-propelled cart illustrated in FIG. 1.

As shown in FIG. 3, a mounting plate 46 may attach the drive assembly 30 to the longitudinal frame members 22 of the cart frame 12 (FIG. 1). This mounting plate 46 may include two lateral support plates 48 extending vertically upward from distal edges 50 of the mounting plate 46 and abutting the outer faces of the longitudinal frame members 22. Preferably, the lateral support plates 48 prevent the mounting plate 46 from shifting or moving laterally relative to the transverse axis of the cart frame 12 (FIG. 1). The mounting plate 46 may be secured against the longitudinal frame members 22 via an attachment post 52 or the like which may extend upward from the top surface 54 of the mounting plate 46 through a mounting bracket 56 abutting the top faces of the longitudinal frame members 22. A fastening device such as a nut 58 or the like may be threaded onto the upper end of the attachment post 52 to secure the mounting plate 46 to the cart frame 12.

Figure 6:
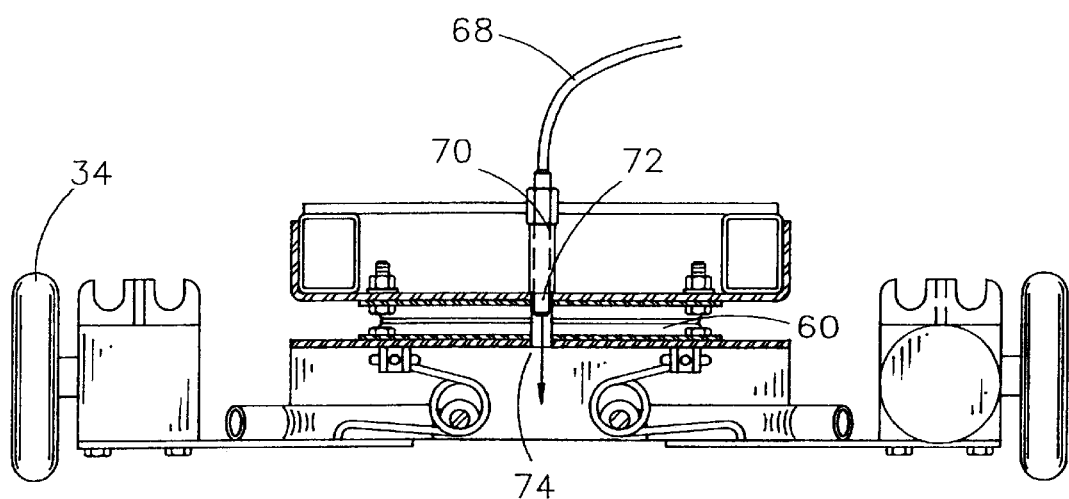
FIG. 6 is a partial cross-sectional side elevational view depicting the drive wheel carriage and further illustrating a locking mechanism adapted to prevent rotation of the carriage.
Figure 7:
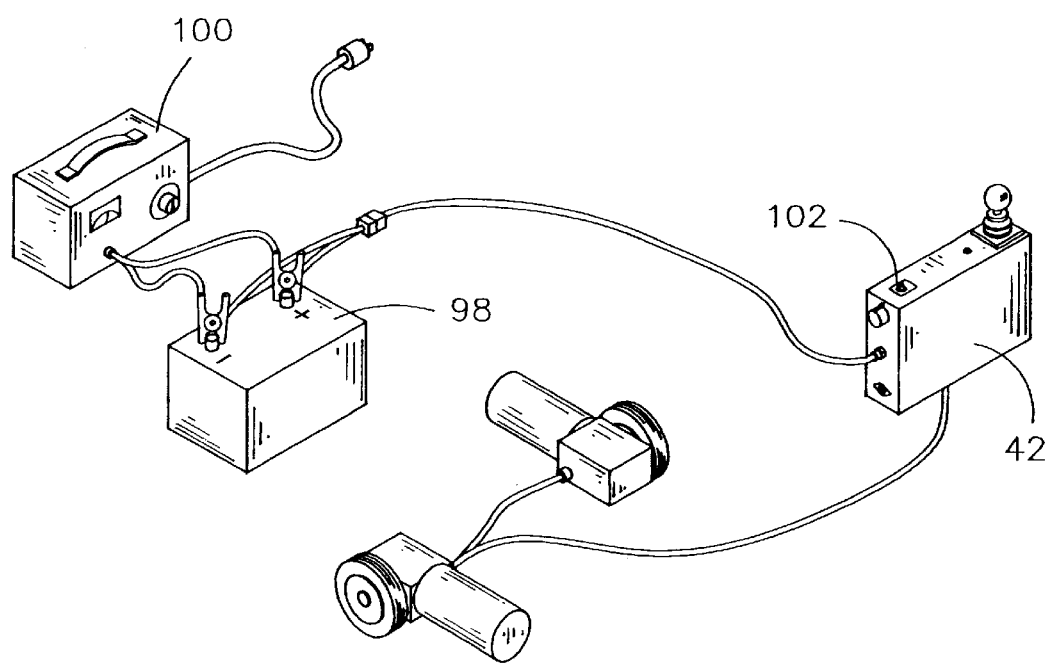
FIG. 7 is a perspective view depicting a preferred electrical interconnection of the controller, reversible motors, batteries, and a battery charger of the present invention.

The drive wheel carriage 32 (FIG. 1) may be mounted to the mounting plate 46 via a turntable 60. The turntable may utilize a plurality of bearings disposed within a ring sandwiched between an upper plate 62 and a lower plate 64 to allow smooth rotation of the plates relative to one another. Preferably, the turntable 60 may be rotated in clockwise or counter-clockwise directions through at least a 90° angle to align the drive wheel carriage 32 along either of the cart's longitudinal and transverse axes. A lever 66 mounted to the underside of the upper frame portion 16 may be operatively connected to the locking mechanism 38 via a push/pull cable 68 or the like (FIG. 1). In an exemplary embodiment, the locking mechanism 38 may include a tube 70 having a pin 72 slidably housed therein. This pin 72 may slidably engage and disengage an aperture 74 provided in the turntable 60 (FIGS. 3 and 6). By rotating the lever 66, an operator may cause the push/pull cable 68 to retract the pin 72 from the aperture 74 in the turntable 60 allowing rotation of the drive wheel carriage 32 relative to the cart frame 12. By rotating the lever 66 in the opposite direction, an operator may cause the push/pull cable 68 to release the pin 72 so that the pin may engage the aperture 74 in the turntable 60 and prevent rotation of the drive wheel carriage 32 (see FIG. 7). Returning now to FIG. 3, the drive wheel carriage preferably includes a carriage frame 76 mounted to the turntable 60 via fasteners such as bolts or the like. A suspension apparatus may be utilized to independently suspend the drive wheels 34. This suspension apparatus preferably includes at least two drive wheel suspension arms 80 which may be pivotally mounted to the carriage frame via axles 82 supported between axle support brackets 84 extending vertically downward from the carriage frame 76. Bushings 84 such as mono-ball bushings, sleeve bushings, or the like allow free rotation of the drive wheel suspension arm 80 about the axle 82. Spacers 86 may extend around the axle 82 between the axle support brackets 84 and the bushings 84 to prevent lateral movement of the drive wheel suspension arm 80. Each drive wheel suspension arm 80 may include a motor mounting plate 88 onto which a reversible motor 36 may be mounted via fasteners such as bolts or the like. One or more torsion springs 90 (two are shown) may extend around the axle 82 and be retained between the two bushings 84. At least one of, a torsion spring 90, a leaf spring, and a helical compression spring, preferably engages a lower surface of the carriage frame 76 and an upper surface of the drive wheel suspension arm 80. At least one of, torsion spring 90, leaf spring, and helical compression spring, preferably provide spring force tending to extend the drive wheel suspension arm 80 away from the carriage frame 32. A spring retainer 92 may prevent the torsion spring 90 from flexing laterally.

Figure 4:
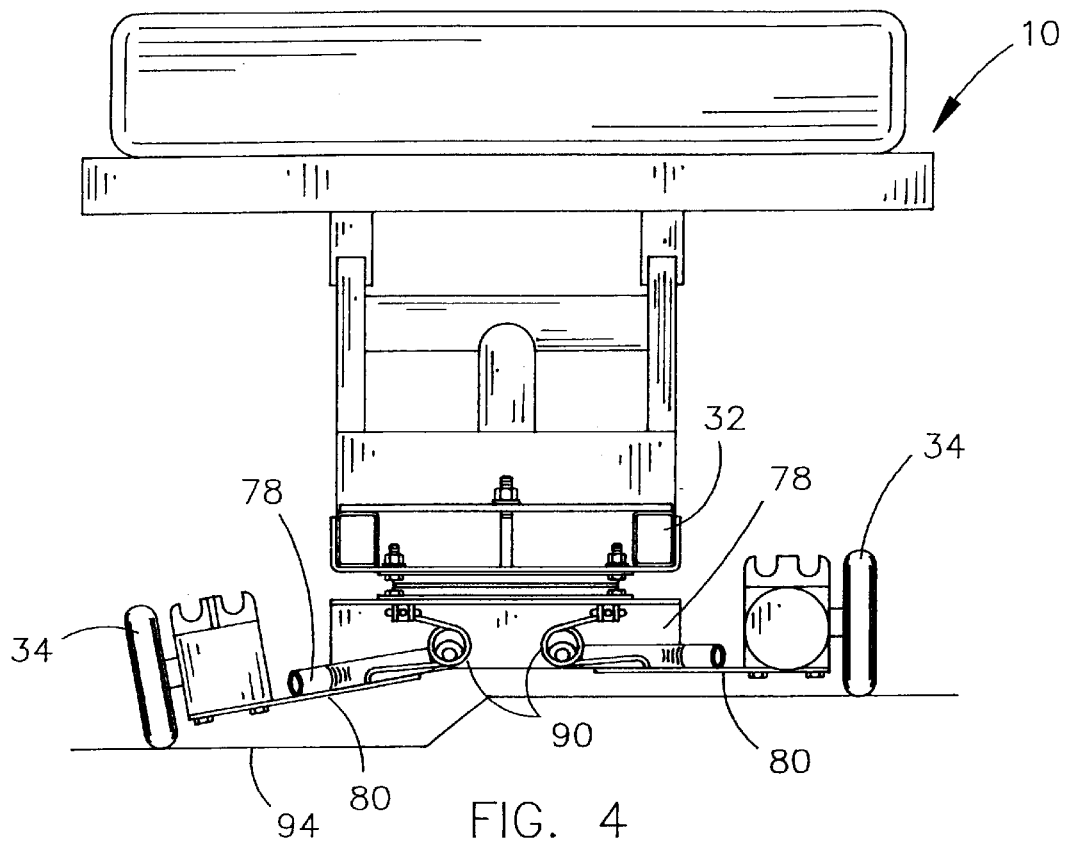
FIG. 4 is a front partial cross-sectional view depicting the drive wheel carriage and further illustrating independent suspension of the drive wheels.
Figure 5:
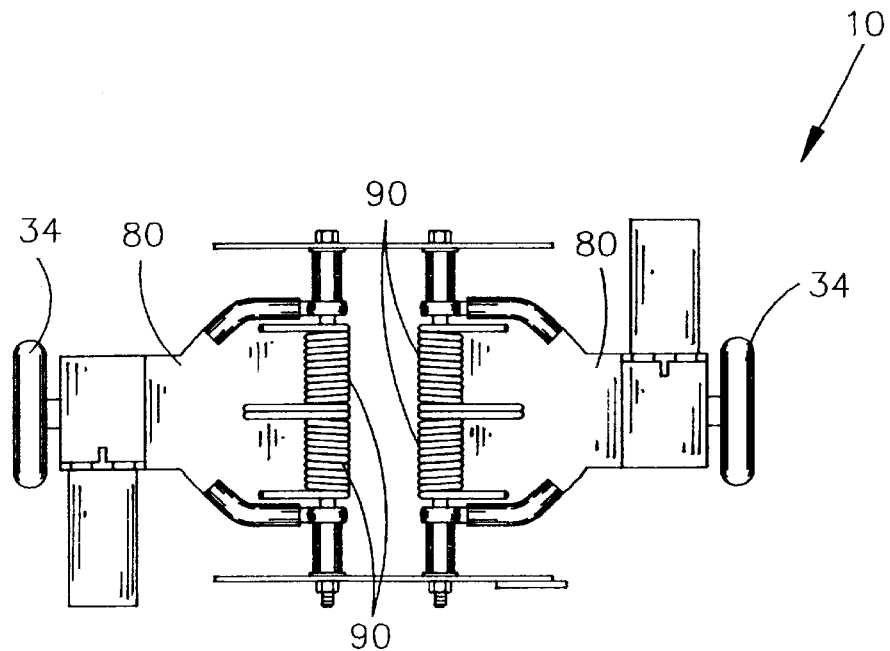
FIG. 5 is a top plan partial cross-sectional view depicting the drive wheel carriage and illustrating the suspension apparatus.

Turning now to FIGS. 4 and 5, advantages of the independent suspension apparatus 78 of the present invention are more clearly illustrated. As shown in FIG. 4, each drive wheel 34 may be independently suspended from the drive wheel carriage 32 wherein that drive wheel may be individually and automatically extended by the torsion spring 90 to engage an uneven surface 94. As the cart 10 passes over an uneven surface 94, the torsion springs 90 may provide a downward spring force on the drive wheel suspension arm 80. This downward force is transferred to the drive wheel 34 causing the drive wheel 34 to maintain contact with the uneven surface 94. As shown in FIG. 5, each drive wheel suspension arm 80 may be independently mounted and may include one or more torsion springs 90 allowing each drive wheel 34 to be extended to contact a ground surface independently of the other drive wheels 34.

As shown in FIGS. 1 and 8, the maneuverable self-propelled cart 10 may include a tray 96 into which an electrical power source such as a battery 98 or the like may be mounted. The battery 98 may provide electrical power to, for example, drive the reversible motors 36 and power the controller 42. Preferably, the battery 98 may be recharged by a charger 100 during periods when the cart is not being utilized (FIG. 8). A fuse, switch or the like 102 may disable the cart by preventing electrical power from being provided to the reversible motors 36 while, for example, the cart's batteries are being recharged, or so that the cart may be safely left unattended.

Returning now to FIG. 1, the maneuverable, self propelled cart may also include a lift assembly 104 to raise and lower the upper frame portion 16 of the cart frame 12 relative to the lower frame portion 14. The lift assembly 104 may be comprised of upper and lower support arms 106 & 108 pivoted between a support 110 mounted to the bottom frame portion 14 and a vertical support pedestal 112 extending downward from the bottom surface of the upper frame portion 16. An actuator 116, such as a hydraulic actuator, electrical actuator, or the like may have a first end pivotally mounted to the bottom frame portion 14 and a second end pivotally mounted to the upper support arm 106. The actuator 116 may be extended and retracted via a controller 122 causing the support arms 106 & 108 to raise and lower the upper frame portion 16. Leveling supports 124 may extend from the vertical support pedestal 112 to the bottom surface of the upper frame portion 16. The leveling supports 124 may include actuators or the like adapted to tilt the upper frame portion about its transverse axis.

The description above should not be construed as limiting the scope of the invention, but as merely providing illustrations to some of the presently preferred embodiments of the invention. In view of the above detailed description of a preferred embodiment and modification thereof, various other modifications will now become apparent to those skilled in the art. The claims below encompass the disclosed embodiments and all reasonable modifications and variations without departing from the spirit and cope of the invention.

What is claimed is:

1. A maneuverable self-propelled cart comprising:
   a cart frame;
   at least two drive wheels;
   a drive wheel carriage adapted to rotate about a substantially vertical axis relative to said cart frame, said drive wheel carriage including,
      a suspension apparatus adapted to independently suspend each of said at least two drive wheels such that each of said at least two drive wheels may individually engage a ground surface;
      a reversible motor coupled to each of said at least two drive wheels, said reversible motor adapted to rotatably drive said drive wheel.

2. The maneuverable self-propelled cart of claim 1, further comprising a turntable for rotatably mounting said drive wheel carriage to said cart frame, said turntable adapted to allow rotation of said drive wheel carriage through at least a 90° arc.

3. The maneuverable self-propelled cart of claim 2, further comprising a locking mechanism mounted to said cart frame, said locking mechanism adapted to engage said turntable to prevent rotation of said drive wheel carriage.

4. The maneuverable self-propelled cart of claim 1, further comprising a swivel wheel mounted to said cart frame in spaced relation to said drive wheel carriage.

5. The maneuverable self-propelled cart of claim 1, wherein said drive wheel carriage comprises a carriage frame rotatably mounted to said cart frame and at least two drive wheel suspension arms pivotally mounted to said drive wheel carriage frame.

6. The maneuverable self-propelled cart of claim 1, wherein said suspension apparatus comprises a coiled torsion spring.

7. The maneuverable self-propelled cart of claim 1, wherein said cart frame comprises a top frame portion, a bottom frame portion, and a lift mechanism, said lift mechanism adapted to raise and lower said top frame portion with respect to said bottom frame portion.

8. The maneuverable self-propelled cart of claim 7, wherein said lift mechanism comprises a support arm having a first end, and a second end, said first end pivotally attached to said bottom frame portion and said second end pivotally attached to said top frame portion, and an actuator pivotally mounted between said support arm and said bottom frame portion, said actuator adapted to extend and retract to raise and lower said top frame portion.

9. The maneuverable self-propelled cart of claim 7 further comprising a lift control apparatus adapted to control said lift mechanism.

10. The maneuverable self-propelled cart of claim 1 further comprising a carriage control apparatus for controlling the operation of said reversible motor.

11. The maneuverable self-propelled cart of claim 1 further comprising an electrical power source for providing electrical power to said reversible motor.

12. A maneuverable self-propelled cart comprising:
   a cart frame;
   a drive wheel carriage frame mounted to said cart frame, said drive wheel carriage frame adapted to rotate about a substantially vertical axis relative to said cart frame;
   at least two drive wheel suspension arms pivotally mounted to said drive wheel carriage frame;
   a reversible motor mounted to each of said at least two drive wheel suspension arms;
   a drive wheel mounted to said reversible motor wherein said reversible motor rotatably drives said drive wheel, and
   a suspension apparatus mounted to each of said at least two drive wheel suspension arms, said suspension apparatus adapted to extend said drive wheel suspension arm beneath said carriage frame such that drive wheel engages a ground surface.

13. The maneuverable self-propelled cart of claim 12, further comprising a turntable for rotatably mounting said drive wheel carriage to said cart frame, said turntable adapted to allow rotation of said drive wheel carriage through at least a 90° arc.

14. The maneuverable self-propelled cart of claim 13, further comprising a locking mechanism mounted to said cart frame, said locking mechanism adapted to engage said turntable to prevent rotation of said drive wheel carriage.

15. The maneuverable self-propelled cart of claim 12, further comprising a swivel wheel mounted to said cart frame in spaced relation to said drive wheel carriage.

16. The maneuverable self-propelled cart of claim 12, wherein said suspension apparatus comprises a coiled torsion spring having a first end and a second end, said first end engaging said carriage frame and said second end engaging said drive wheel suspension arm.

17. The maneuverable self-propelled cart of claim 12, wherein said cart frame comprises a top frame portion, a bottom frame portion, and a lift mechanism, said lift mechanism adapted to raise and lower said top frame portion with respect to said bottom frame portion.

18. The maneuverable self-propelled cart of claim 17, wherein said lift mechanism comprises a support arm having a first end, and a second end, said first end pivotally attached to said bottom frame portion and said second end pivotally attached to said top frame portion, and an actuator pivotally mounted between said support arm and said bottom frame portion, said actuator adapted to extend and retract to raise and lower said top frame portion.

19. The maneuverable self-propelled cart of claim 17 further comprising a lift control apparatus adapted to control said lift mechanism.

20. The maneuverable self-propelled cart of claim 12 further comprising a carriage control apparatus for controlling the operation of said reversible motor.

21. The maneuverable self-propelled cart of claim 12 further comprising an electrical power source for providing electrical power to said reversible motor.

22. A maneuverable self-propelled cart comprising:
   a cart frame;
   a drive wheel carriage having at least two drive wheel suspension arms pivotally mounted thereto;
   a turntable mounting said drive wheel carriage to said cart frame, said turntable adapted to allow rotation of said drive wheel carriage relative to said cart frame;
   a reversible motor mounted to each of said at least two drive wheel suspension arms;
   a drive wheel rotatably mounted to said reversible motor wherein said reversible motor rotatably drives said drive wheel; and
   a suspension apparatus mounted to each of said at least two drive wheel suspension arms, said suspension apparatus adapted to support said cart frame; and
   a carriage control apparatus for controlling the operation of said reversible motor.

23. The maneuverable self-propelled cart of claim 22, further comprising a locking mechanism mounted to said cart frame, said locking mechanism adapted to engage said turntable to prevent rotation of said drive wheel carriage.

24. The maneuverable self-propelled cart of claim 22, further comprising a swivel wheel mounted to said cart frame in spaced relation to said drive wheel carriage.

25. The maneuverable self-propelled cart of claim 22, wherein said suspension apparatus comprises a coiled torsion spring having a first end and a second end, said first end engaging said carriage frame and said second end engaging said drive wheel suspension arm.

26. The maneuverable self-propelled cart of claim 22, wherein said cart frame comprises a top frame portion, a bottom frame portion, and a lift mechanism, said lift mechanism adapted to raise and lower said top frame portion with respect to said bottom frame portion.

27. The maneuverable self-propelled cart of claim 26, wherein said lift mechanism comprises a support arm having a first end, and a second end, said first end pivotally attached to said bottom frame portion and said second end pivotally attached to said top frame portion, and an actuator pivotally mounted between said support arm and said bottom frame portion, said actuator adapted to extend and retract to raise and lower said top frame portion.

28. The maneuverable self-propelled cart of claim 26 further comprising a lift control apparatus adapted to control said lift mechanism.

29. The maneuverable self-propelled cart of claim 22 further comprising an electrical power source for providing electrical power to said reversible motor.

30. A maneuverable self-propelled cart comprising:
   a cart frame;
   at least three swivel wheels distally mounted to said cart frame for supporting the cart;
   at least two drive wheels;
   a drive wheel carriage adapted to rotate about a substantially vertical axis relative to said cart frame, said drive wheel carriage including
      a suspension apparatus adapted to independently suspend each of said at least two drive wheels such that each of said at least two drive wheels may individually engage a ground surface;
   a reversible motor coupled to each of said at least two drive wheels, said reversible motor adapted to rotatably drive said drive wheel.

* * * * *